United States Patent [19]
Lutz et al.

[11] 3,876,246
[45] Apr. 8, 1975

[54] ARRANGEMENT OF AN INTERIOR COVERING OF A MOTOR VEHICLE ROOF

[75] Inventors: Edgar Lutz, Althengstett; Heinz Stahl, Sindelfingen; Walter Gantzhorn, Doffingen, all of Germany

[73] Assignee: Daimler-Benz Aktiengesellschaft, Stuttgart, Germany

[22] Filed: Apr. 27, 1973

[21] Appl. No.: 355,277

[30] Foreign Application Priority Data
 Apr. 29, 1972 Germany.......................... 2221192

[52] U.S. Cl............................ 296/137 A; 24/214 X
[51] Int. Cl................................................ B60j 7/00
[58] Field of Search ...... 296/137 A; 24/208 A, 214, 24/213 R, 73 PM, 73 PF, 73 P

[56] References Cited
UNITED STATES PATENTS

| | | | |
|---|---|---|---|
| 1,607,145 | 11/1926 | Anderson | 24/214 |
| 2,099,134 | 11/1937 | Nissley | 296/137 A |
| 2,635,917 | 4/1953 | Newman | 296/137 A |
| 3,093,027 | 6/1963 | Rapata | 24/214 X |
| 3,249,973 | 5/1966 | Seckerson | 24/214 X |
| 3,433,526 | 3/1969 | Field et al. | 296/137 A |

*Primary Examiner*—Allen N. Knowles
*Attorney, Agent, or Firm*—Craig & Antonelli

[57] ABSTRACT

An arrangement of the interior covering of a motor vehicle roof, which consists of fabric or plastic material and is secured at the roof frame; the roof frame is provided for that purpose with apertures for expanding rivets piercing through the interior covering and retaining the same at the roof frame by clip-in action.

13 Claims, 4 Drawing Figures

ARRANGEMENT OF AN INTERIOR COVERING OF A MOTOR VEHICLE ROOF

The present invention relates to an arrangement of an interior covering of a motor vehicle roof which consists of textile fabric or of plastic material of conventional type, such as vinyl plastic material, and is secured at the roof frame.

Such an interior covering, the so-called ceiling, is generally fastened by gluing its edges to the roof frame. The central area is tensioned by steel supports inserted into the lateral bearers of the roof frame. This adhesive fastening, however, requires a considerable expenditure of time during the assembly and installation.

The present invention is concerned with the task to provide an arrangement of the aforementioned type which permits a simple and fast assembly and installation. The present invention essentially consists in that the roof frame is provided with apertures for expanding rivets or pins extending through and retaining the interior covering. This arrangement allows a very simple assembly in which the interior covering is locally tensioned and subsequently is pierced by the expanding rivets.

In order to facilitate the locating of the apertures of the roof frame through the interior covering, provision is made in one embodiment according to the present invention that the roof frame is provided with profilings within the area of the apertures.

In one appropriate embodiment of the present invention, provision is made that the edges of the interior covering and/or the expanding rivets are covered with a preferably padded cover. Insofar as the expanding rivets are not covered off by a cover, it is appropriate if the expanding rivets are provided with heads which are matched to the color of the interior covering.

In one particularly appropriate embodiment of the expanding rivets according to the present invention, provision is made that the expanding rivets consisting of synthetic plastic material include a bolt which is locally enlarged and is adapted to be clipped into the apertures, with the bolt terminating in a pointed sharp tip.

Accordingly, it is an object of the present invention to provide an arrangement of the interior covering of a motor vehicle rod which avoids by simple means the aforementioned shortcomings and drawbacks encountered in the prior art.

Another object of the present invention resides in the arrangement of an interior covering of a motor vehicle roof which permits a simple installation and rapid assembly.

A further object of the present invention resides in a motor vehicle roof with an interior covering which facilitates to the assemblying personnel the task of properly locating the assembly openings in the roof frame behind the interior covering to be fastened thereto.

These and further objects, features and advantages of the present invention will become more apparent from the following description when taken in connection with the accompanying drawing which shows, for purposes of illustration only, one embodiment in accordance with the present invention and wherein.

Figure 1:
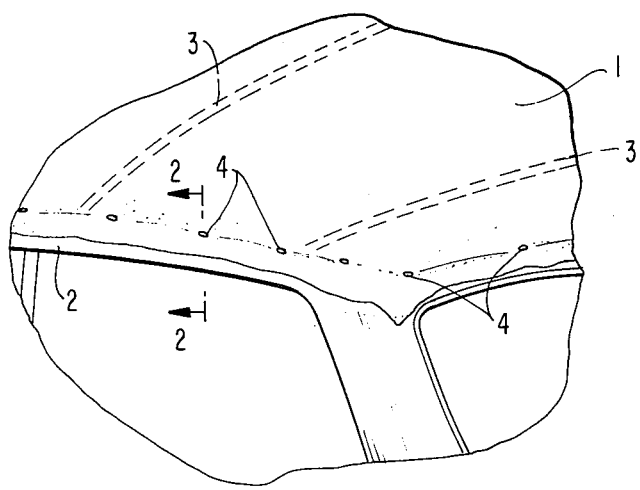
FIG. 1 is a partial perspective view of the inside of a motor vehicle roof with an interior covering of the motor vehicle roof arranged in accordance with the present invention.

Referring now to the drawing wherein like reference numerals are used throughout the various views to designate like parts, the roofs of motor vehicles, especially of passenger motor vehicles are generally equipped with an interior covering 1 which consists of fabric or preferably plastic material of conventional type. This inner covering 1 is connected at its edges with the roof frame 2 of a vehicle whereas it is tensioned in the central area by steel support rods 3 indicated in dash line which extend transversely across the vehicle and are inserted into the two roof longitudinal bearers.

The edges of the interior covering 1 are retained according to the present invention by expanding rivets or snap-in pins generally designated by reference numeral 4 which are clipped into corresponding apertures 5 (FIG. 2) of the roof frame. These expanding rivets 4 pierce through the locally tensioned interior covering 1.

In order to enable an easy locating of the apertures 5 of the roof frame 2 through the interior covering 1 consisting of synthetic plastic material or of fabric, in the illustrated embodiment embossments or indentations 6 are provided at the roof frame 2 within the area of the apertures 5.

Figure 2:
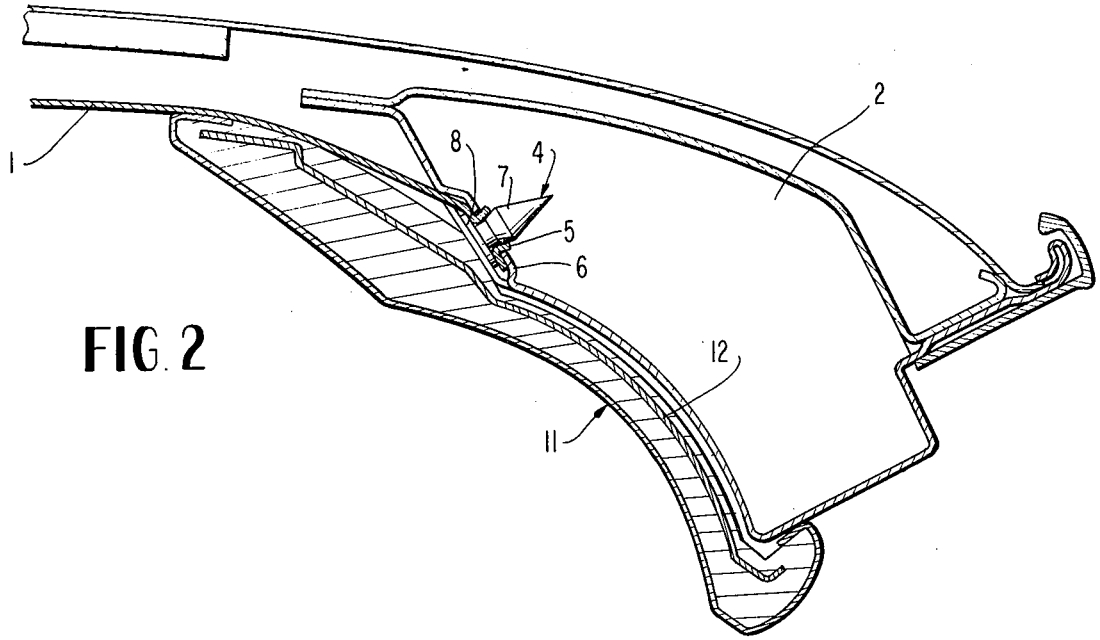
FIG. 2 is a somewhat schematic, partial cross-sectional view, on an enlarged scale, taken along line II—II of FIG. 1.

As illustrated in FIG. 2, the pointed tapering bolt 7, which terminates in a sharp point, pulls the interior covering 1 partially into the apertures 5 whereas externally the interior covering 1 is pulled into the indentations 6 by the head portions 8 of the expanding rivets 4.

Figure 3:
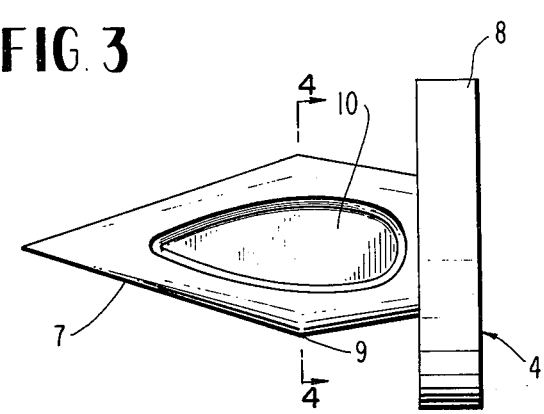
FIG. 3 is a side elevational view of an individual part of the arrangement according to FIG. 1.
Figure 4:
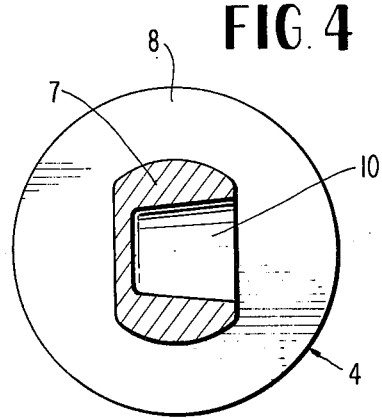
FIG. 4 is a cross-sectional view taken along line IV—IV of FIG. 3.

The expanding rivets 4 consist essentially of a bolt portion 7 and of a head portion 8 as illustrated in FIGS. 3 and 4. The bolt 7 terminates in a sharp point so that the interior covering 1 can be pierced relatively easily. It includes a local enlargement 9 which engages the sheet metal member of the roof frame 2 from behind and thus permits a clip-like fastening. The expanding rivet or pin 4 made of any suitable synthetic resinous material is flattened off on both sides within the area of its bolt 7 (FIG. 4). Additionally, the bolt 7 is provided with a drop-shaped recess 10 open on one side and extending in its longitudinal direction which extends over the area in front and to the rear of the local enlargement 9. This recess 10 leads to the feature that the bolt 7 is elastically deformable within the area of its local enlargement 9.

As is illustrated in FIG. 2, the edges of the interior covering 1 and the expanding rivets 4 are covered off by a cover means generally designated by reference numeral 11 which, for example, consists of a sheet metal part 12 surrounded by a conventional foamed material such as a synthetic resinous foamed material. This surrounding cover means 11 which is preferably composed of individual parts can be fastened at the roof frame 2 by clips or bolts or the like.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. An interior roof covering arrangement for a motor vehicle having roof frame means, wherein the roof frame means include aperture means for receiving interior roof covering retaining means, wherein said aperture means have profiling means to facilitate the locating of the aperture means through the interior roof covering, and wherein roof covering retaining means are provided to pierce the interior roof covering and retain the same on said frame means.

2. An arrangement according to claim 1, wherein the interior roof covering consists of fabric or plastic material.

3. An arrangement according to claim 1, wherein the roof frame means are metallic.

4. An arrangement according to claim 1, wherein the retaining means comprise expanding rivet means.

5. An arrangement according to claim 4, wherein at least one of the two parts consisting of interior roof covering and expanding rivet means have edges which are provided with a cover means.

6. An arrangement according to claim 5, wherein said cover means is padded.

7. An arrangement according to claim 6, wherein the interior covering as well as the expanding rivet means have edges which are provided with such cover means.

8. An arrangement according to claim 5, wherein the expanding rivet means include head portions which are matched to the color of the interior roof covering.

9. An arrangement according to claim 8, wherein the expanding rivet means consist of synthetic plastic material and include a locally enlarged bolt portion adapted to be clipped into the aperture means, said bolt portion terminating in a pointed tip.

10. An arrangement according to claim 9, wherein the bolt portion has flattened sides.

11. An arrangement according to claim 10, wherein the bolt portion is provided with a recess extending in the longitudinal direction open on one side.

12. An arrangement according to claim 1, wherein the profiling means each comprise an embossment in the roof frame means surrounding each aperture means.

13. An arrangement according to claim 1, wherein the profiling means each comprise an indentation in the roof frame means surrounding each aperture means.

* * * * *